United States Patent [19]

Turek et al.

[11] Patent Number: 5,579,514
[45] Date of Patent: Nov. 26, 1996

[54] METHODOLOGY FOR INCREASING THE AVERAGE RUN LENGTH PRODUCED BY REPLACEMENT SELECTION STRATEGY IN A SYSTEM CONSISTING OF MULTIPLE, INDEPENDENT MEMORY BUFFERS

[75] Inventors: John J. E. Turek; Philip S. Yu, both of Chappaqua, N.Y.

[73] Assignee: International Business Machines Corporation, Armonk, N.Y.

[21] Appl. No.: 142,536

[22] Filed: Oct. 22, 1993

[51] Int. Cl.⁶ .................................................. G06F 17/30
[52] U.S. Cl. .................. 395/607; 364/962.2; 364/962.3; 364/DIG. 2
[58] Field of Search .............................................. 395/600

[56] References Cited

U.S. PATENT DOCUMENTS

| | | | |
|---|---|---|---|
| 4,575,798 | 3/1986 | Lindstrom et al. | 364/300 |
| 4,766,534 | 8/1988 | DeBenedictis | 395/200 |
| 5,111,465 | 5/1992 | Edem et al. | 371/54 |
| 5,142,687 | 8/1992 | Lary | 395/800 |
| 5,179,699 | 1/1993 | Iyer et al. | 395/650 |
| 5,185,886 | 2/1993 | Edem et al. | 395/600 |
| 5,307,485 | 4/1994 | Bordonard et al. | 395/600 |
| 5,349,684 | 9/1994 | Edem et al. | 395/800 |

*Primary Examiner*—Thomas G. Black
*Assistant Examiner*—Peter Y. Wang
*Attorney, Agent, or Firm*—Ronald L. Drumheller; Richard M. Ludwin

[57] ABSTRACT

A range of key values is partitioned into a plurality of key subranges equal in number to the number of record storage areas available for the sort. One of the key subranges is then assigned to each of the record storage areas and records to be sorted are transferred to the record storage areas in accordance with a sort key value within each record and the key subrange assigned to each of the record storage areas. Whenever a record is transferred to a filled record storage area, a record from the filled record storage area is transferred to an output string, namely the record that has the lowest key value that is not lower than the last record added to the output string of the filled record storage area. Whenever a record is transferred from a filled record storage area to the output string and has a higher key value than the last record added to said output string, the key subrange for the filled record storage area is updated to begin at the higher key value, and, the ending key value of the next lower subrange is increased to a new value which is not lower than the higher key value.

20 Claims, 6 Drawing Sheets

FIG. 6

| ROUND | PROCESSOR A | | | PROCESSOR B | | | PROCESSOR C | | |
|---|---|---|---|---|---|---|---|---|---|
| | TREE | RANGE | RUNS | TREE | RANGE | RUNS | TREE | RANGE | RUNS |
| 0 | | 1...4 | | | 5...8 | | | 9...12 | |
| 1 | 3 | 2...4 | 2 | 7 | 5...8 | | | 9...12,1...1 | |
| 2 | 4 | 3...6 | 2,3 | 8 | 7...8 | 5,7 | | 9...12,1...2 | |
| 3 | 6 | 4...6 | 2,3,4 | 8 | 7...8 | 5,7 | 2 | 9...12,1...3 | |
| 4 | 6 | 4...6 | 2,3,4 | 8 | 7...12,1...1 | 5,7 | 2 | 1...3 | 9,10,11,1 |

TABLE 1: EXAMPLE OF PARALLEL TOURNAMENT TREE

METHODOLOGY FOR INCREASING THE AVERAGE RUN LENGTH PRODUCED BY REPLACEMENT SELECTION STRATEGY IN A SYSTEM CONSISTING OF MULTIPLE, INDEPENDENT MEMORY BUFFERS

BACKGROUND OF THE INVENTION

1. Field of the Invention

The present invention relates to improving the efficiency of external sorting when using a set of independent memory buffers. In particular, the problem of generating sorted runs from an initially unsorted data set is considered.

2. Related Art

The problem of sorting data is one of the most common operations in data management. When all the data fits into the available memory efficient sorting dictates the reduction in the number of comparison operations applied. Well known techniques such as quick-sort (The Art of Computer Programming: Sorting and Searching by D. Knuth, published by Addison Wesley (1973)) is typically used for this purpose. However, when the data no longer fits into the available memory reducing the I/O between main memory and disk becomes the primary concern.

Efficient external sorting of data, i.e., when the amount of data to be sorted is larger than the available memory, requires reducing the amount of I/O to and from disk. A common way of achieving this goal is by first generating sorted runs of data to the disk and then merging these runs into a single sorted run. Maximizing the length of these initial sorted runs is an important part of reducing the total I/O associated with external sorting.

In The Art of Computer Programming: Sorting and Searching, by D. Knuth, published by Addison Wesley (1973) an effective approach, called replacement selection for creating these initial sorted runs is presented. The technique presented there operates on a single buffer. Assuming a random data distribution, the average length of a run created by this approach is 2 m where m is the size of the buffer. A typical way of implementing the replacement selection strategy is through the use of the tournament tree approach whereby data is first written to disk in stored runs using a tournament tree. These runs are then merged into a single sorted list. For the purpose of this disclosure we can view the tournament tree as being a black box with the following properties: when a tuple (an element or record to be sorted) is read from disk it is inserted into the tournament tree. When the tournament tree is full and before the next tuple can be read from disk one of the tuples in the tournament tree needs to be written out to disk. The way this tuple is selected is as follows: tuples are written to disk in sorted runs. We consider the last tuple a written to the current sorted run. We select the smallest tuple b in the tournament tree such that b>a to write to disk. If no such tuple b exists then we start a new run and write the smallest tuple in the tournament tree to disk.

In "An Efficient Percentile Partitioning Algorithm For Parallel Sorting" by B. Iyer, G. Ricard and P. Varman, published in the Proceedings of the 15th International Conference on Very Large Databases (1989) pages 135–144, a parallel sort is presented in which multiple independent processors first sort using replacement selection the data stored on their individual disks. Final destinations are selected based on the initial sorted runs and the data is then sent to the final destination and merged. However, there is no cooperation among the processors during this initial phase.

So the average run length produced by the initial replacement selection algorithm remains 2 m.

In "System Issues In Parallel Sorting For Database" by B. Iyer and D. Dias, published in Proceedings of the 6th International Conference On Data Engineering (1990) pages 246–255, the parallel sorting algorithm presented by Iyer, Ricard and Varman is studied further. Again, the resulting algorithms assume no cooperation among the processors during the initial sorting phase so the average run length remains unaffected.

In "Parallel Sorting On A Shared Nothing Architecture Using Probabilistic Splitting" by D. DeWitt, J. Naughton and D. Schneider, published in Proceedings of the First International Conference On Parallel and Distributed Information Systems (1991) pages 280–291, a parallel sort based on preliminary sampling is presented. In this approach each processor independently samples its disks and then uses this information to decide the destination processor for each of the records. The data is then sent to the final destination where it is sorted. Again, there is no cooperation among the processors during the sorting phase.

In "Parallel Sorting Methods For Large Data Volumes On A Hypercube Database Computer" by B. Baugsto and J. Greipsland, published in Proceedings of the Sixth International Workshop On Database Machines by Springer-Verlag (1989), pages 127–141, external algorithms for parallel sorting on a hypercube are presented. Their work also uses sampling to determine the initial partitions and does not address the issue of creating initial sorted runs.

In "Tuning A Parallel Database Algorithm On Shared Memory" by G. Graefe and S. Thakkar, in Software—Practical Experience, vol. 22, no. 7 (1992), pages 495–517, a parallel external sorting algorithm is presented. However, their work focuses on a shared memory system and does not address the issue of independent buffers.

In "Sorting By Natural Selection" by W. Frazer and D. Wong, in Communication of the ACM (1972), pages 910–913, a technique is given for increasing the length of the sorted run by storing tuples that could not fit into the current run. However, their work trades off disk I/O during the creation of the sorted run in order to increase the size of the sorted runs as opposed to considering cooperation with external buffers.

SUMMARY OF THE INVENTION

In light of the foregoing, there is provided an external parallel sort method for use in a computer system having a plurality of record storage areas available for sorting. In accordance with the method, a range of key values are partitioned into a plurality of key subranges equal in number to the number of record storage areas available for the sort. One of the key subranges is then assigned to each of the record storage areas and a group of records to be sorted is transferred to the record storage areas in accordance with a sort key value within each record and the key subrange assigned to each of the record storage areas. When a record is transferred to a filled record storage area, a record from the filled record storage area is transferred to an output string. The record transferred to the output string is the record that has the lowest key value that is not lower than the last record added to the output string of the filled record storage area. When a record is transferred from a filled record storage area to the output string and has a higher key value than the last record added to said output string, the key subrange for the filled record storage area is updated to begin at the higher key value. Further, when a key subrange is updated to begin at a higher key value than an ending key value of the next lower subrange, the ending key value of the next lower subrange is increased to a new value which is not lower than the higher key value. A subrange is considered to be lower than another subrange when the lowest value key it contains is lower than the lowest value key contained in the other subrange.

When creating original sorted runs in standard sorting techniques, each processor operates in isolation. Assuming randomly organized data, the expected length of the original sorted runs produced by an algorithm such as that given by Iyer, Ricardi, and Varman will be around 2 m where m is the number of tuples that can be stored in the memory of each processor. As the number of processors P increases 2 m becomes significantly less than the total number of tuples Pm that can be held in the memory of the system. In order to assure optimality it is necessary to create, in parallel, expected run sizes of 2 Pm at each of the processors. Here, we address the issue of increasing the size of the initial sorted runs. We give a technique that can increase the size of the sorted runs by up to a factor of P thus yielding runs with an expected size of 2 Pm. This invention allows one to trade off communication between the multiple buffers against disk I/O. For example, assuming that the cost of network I/O (between processors) is less than disk I/O. This technique can be used to improve the efficiency of the parallel sorting algorithm proposed by Iyer, Ricardi and Varman.

In accordance with the present invention the size of the sorted runs are increased based on cooperation among the processors. We describe the invention at an abstract level assuming that there is only one processor operating on multiple independent buffers as shown in FIG. 1. However, the invention can be extended in a straightforward manner to include any system comprising multiple independent buffers including the shared nothing environment depicted in FIGS. 2A and 2B.

In a first stage of the procedure, each of the P buffers is initialized so as to contain no tuples. Then the universe of possible key values is divided into P subranges $R_1 \ldots R_p$ such that the union the $R_i$'s covers the universe of possible key values. Let U be the total number of possible key values, in a preferred embodiment the subranges would each contain U/P contiguous key values. (In practice one may gain some benefit by first sampling the set of possible ranges and partitioning according to the results of the sample. However, the proposed technique is self-adjusting so that, even if a poor partition is initially selected, as the algorithm proceeds the optimal partitioning will be automatically established.) Finally, each buffer is assigned responsibility for one of these ranges. Depending on the initial data distribution different partitions and assignments would be desirable. While the method used to select the ranges does not affect the correctness of the proposed invention it may affect the overall efficiency.

In a second stage of the procedure, tuples are read from disk and assigned to one of the buffers responsible for a range including the key value of the tuple read from disk. The tuple is then inserted into the buffer using the standard replacement selection mechanism. That is, if the buffer is full then the tuple with the smallest key in the buffer that is larger than the key value of the last tuple written to the output stream for that buffer is first written to the output stream for that buffer. Then, the new tuple is inserted into the buffer. As a result of the insertion, the subrange of keys associated with each of the buffers is dynamically adjusted.

Let $s_i$ be the value of the last tuple written on behalf of buffer i (or if no tuple has been written out the minimum value of the initial range defined for buffer i). In a preferred embodiment the subrange $R_i$ will be dynamically defined as the range in between $s_i$ and the smallest tuple in buffer $R_{i+1}$. (In practice it will be desirable to have the subrange $R_i$ be dynamically defined as the range in between $s_i$ and the $k^{th}$ smallest tuple in buffer $R_{i+1}$—where k is a system selected value between 1 and the size of buffer $R_{i+1}$. (This overlap of subranges is useful for dealing with the asynchronous nature of some parallel machines by allowing some sloppiness in the definition of the ranges associated with a given processor.)

BRIEF DESCRIPTION OF THE DRAWINGS

Like reference numerals appearing in more than one drawing depict like elements.

DETAILED DESCRIPTION OF THE PREFERRED EMBODIMENTS

Figure 1:
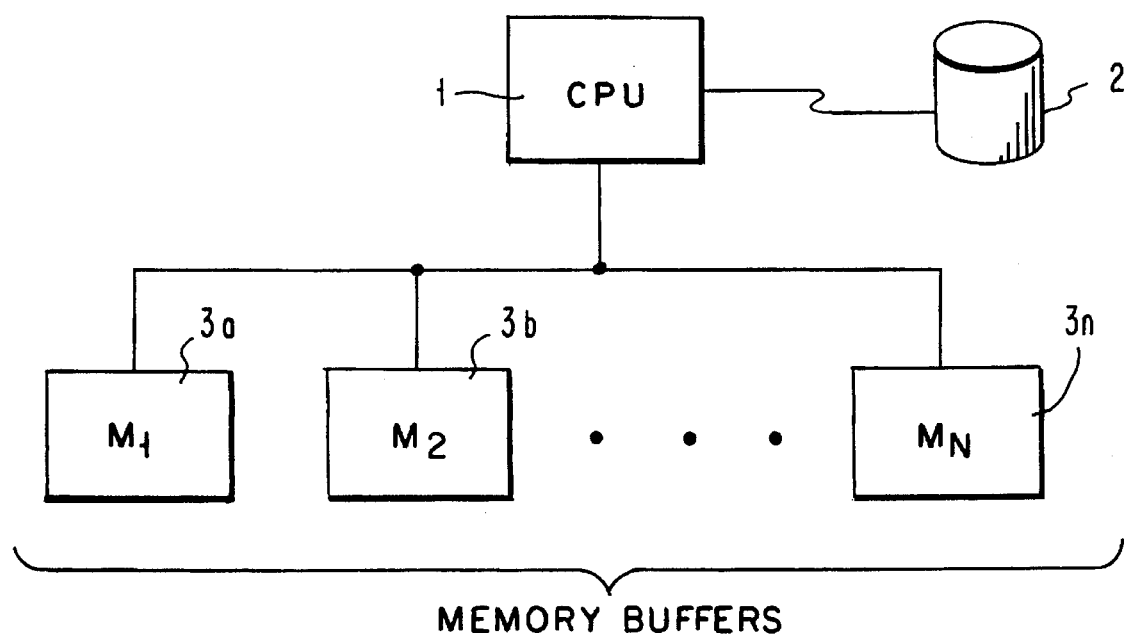
FIG. 1 is a block diagram of a uniprocessor system having a multiple buffer pool.
Figure 2A:
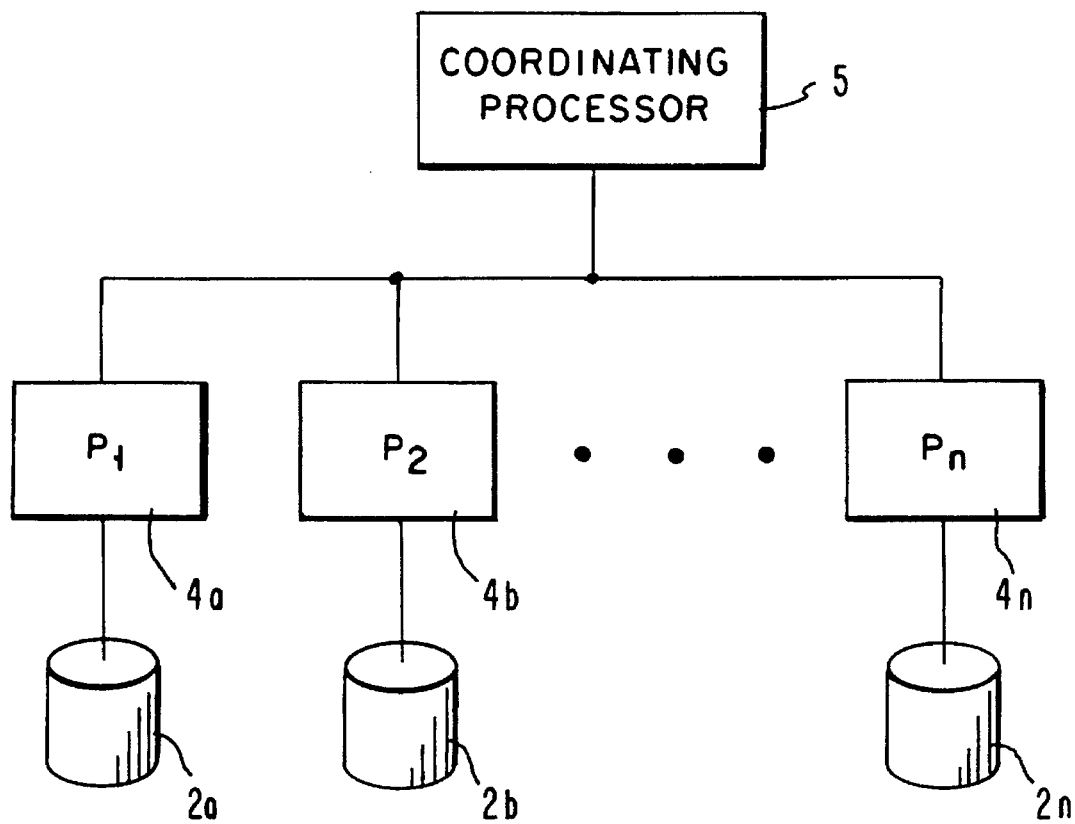
FIG. 2a is a block diagram of a multiprocessor system having a coordinating processor.
Figure 2B:
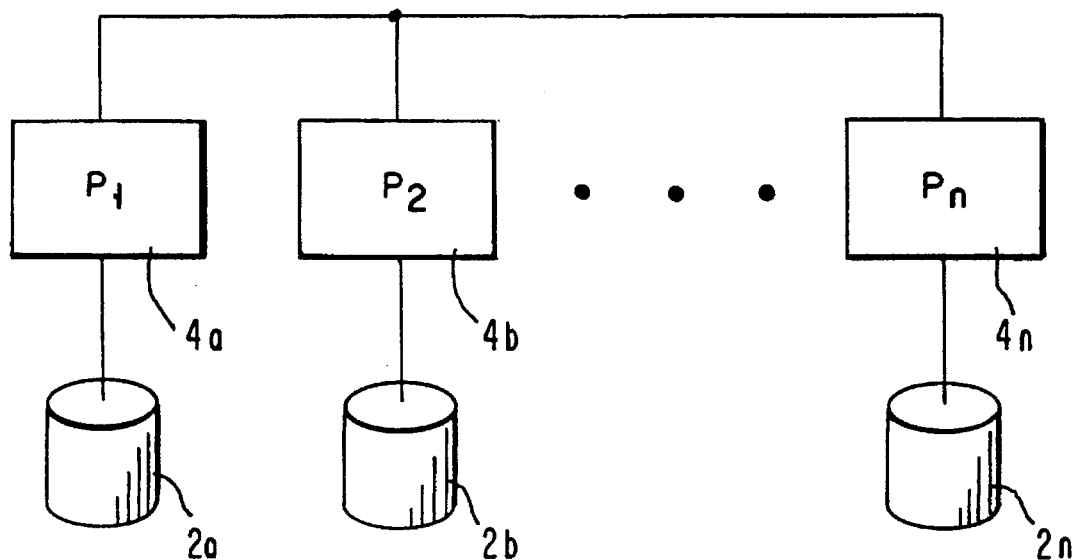
FIG. 2b is a block diagram of a multiprocessor system without a coordinating processor.

FIGS. 1, 2a and 2b show computer systems suitable for use with the sorting method of the present invention. FIG. 1 is a block diagram of a uniprocessor system having a single CPU 1 coupled to a disk 2 and multiple memory buffers 3a–3n. FIG. 2a is a block diagram of a multiprocessor system having multiple processors 4a–4n which operate under control of a coordinating processor 5. Each of the processors 4a–4n is coupled to an associated disk 2a–2n. The processors 4a–4n each include a CPU and associated memory. FIG. 2b is a block diagram of a multiprocessor system wherein the processors operate without a coordinating processor.

In the following description it is assumed for the sake of simplicity that there is a single processor reading data and sorting the tuples on the independent memory buffers (as shown in FIG. 1). In a parallel system as shown in FIGS. 2a and 2b processors can read the data and use the same selection criteria in order to ship the tuples to the appropriate buffer. Those of skill in the art will recognize the method of FIGS. 3–5 can be implemented by way of program code executing on the processors of any of FIGS. 1, 2a and 2b.

Figure 3:
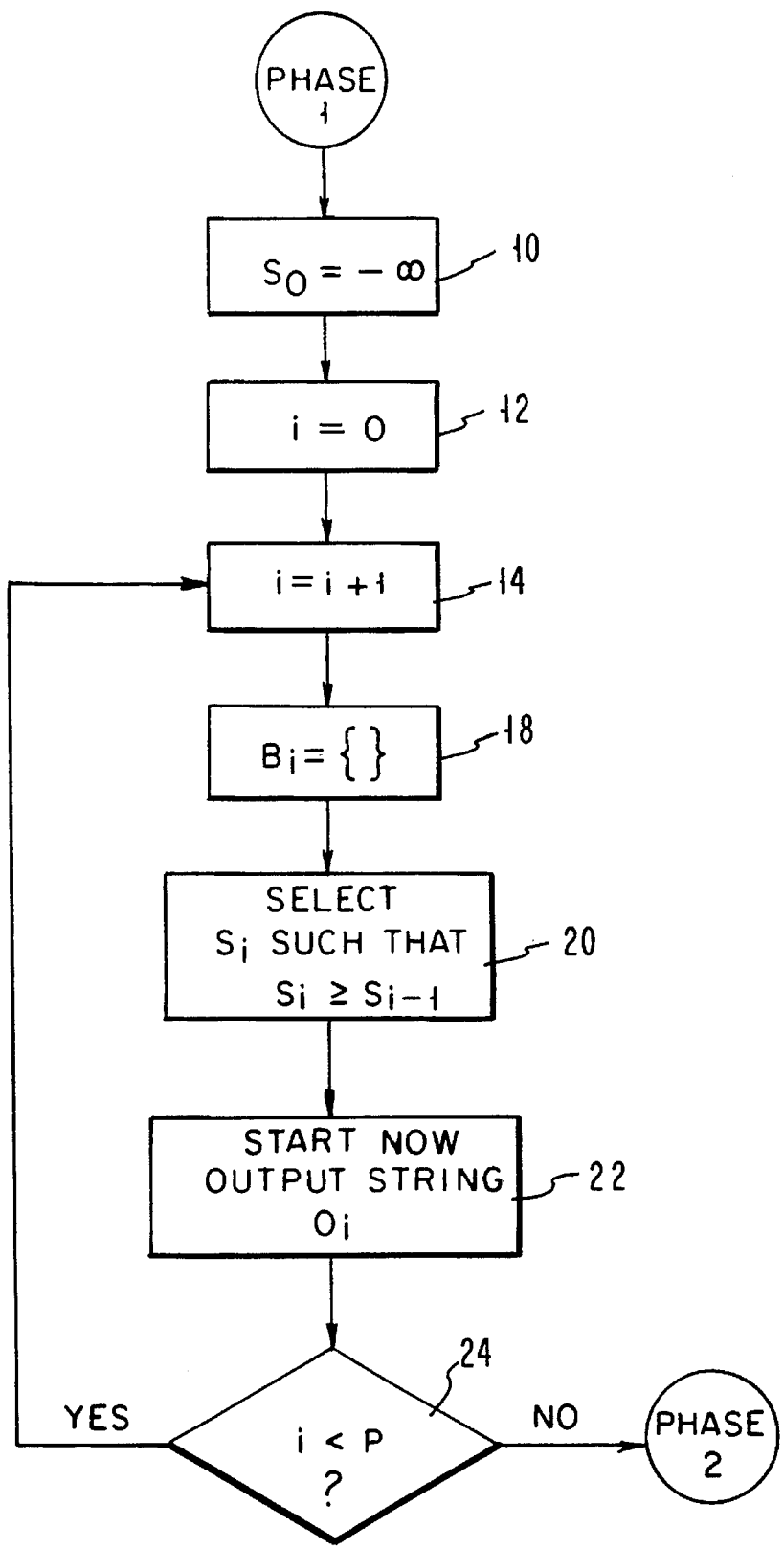
FIGS. 3 through 5 are a flow chart of a sorting method according to an embodiment of the present invention; and, FIG. 6 is a table showing an example of tuple transmission according to an embodiment of the present invention.

Referring now to the drawings and in particular FIG. 3 there is shown a block diagram of the initialization phase of a sort method according to an embodiment of the present invention. This initialization is initiated in block 10 where i is used to denote the buffer being initialized. Initially we define the $0^{th}$ buffer (an imaginary buffer) to have a lower bound of minus infinity (i.e., a value smaller than any legal key value). In block 12 we set i to 0 in order to start the loop defined by blocks 14 through 24.

The loop defined by blocks 14 through 24 iterates through each of the memory buffers defining the initial state of each of the buffers. In block 14 the next block to be initialized is selected. In block 18 the buffer that is being initialized is emptied so that it contains no tuples.

In block 20 a lower bound on the key value for the current buffer is selected. This value can be any key value that is no smaller than the upper bound defined for the previous buffer (for the first buffer the previous buffer is the 0th buffer. In our preferred embodiment, this value will be chosen so that the $i^{th}$ processor gets a lower bound corresponding to the $U \times i^{th}/P$ largest key value, where U is the total number of key values in the system and P is the total number of buffers. (In practice, the selection of this value will affect the overall efficacy of this invention. The ideal value is one that partitions the range of key values so that the key values of the tuples read from disk will be equally likely to fall into any of the partitions. In a parallel system like that shown in FIGS. 2a an 2b, network overhead would have to be factored in to the calculation of the ideal partition.)

In block 22 the output string associated with the current buffer is initialized to the empty stream. The sorted runs from the current buffer will, subsequently, be placed onto this output string. The loop terminates in block 24 when the last buffer has been initialized.

Figure 4:
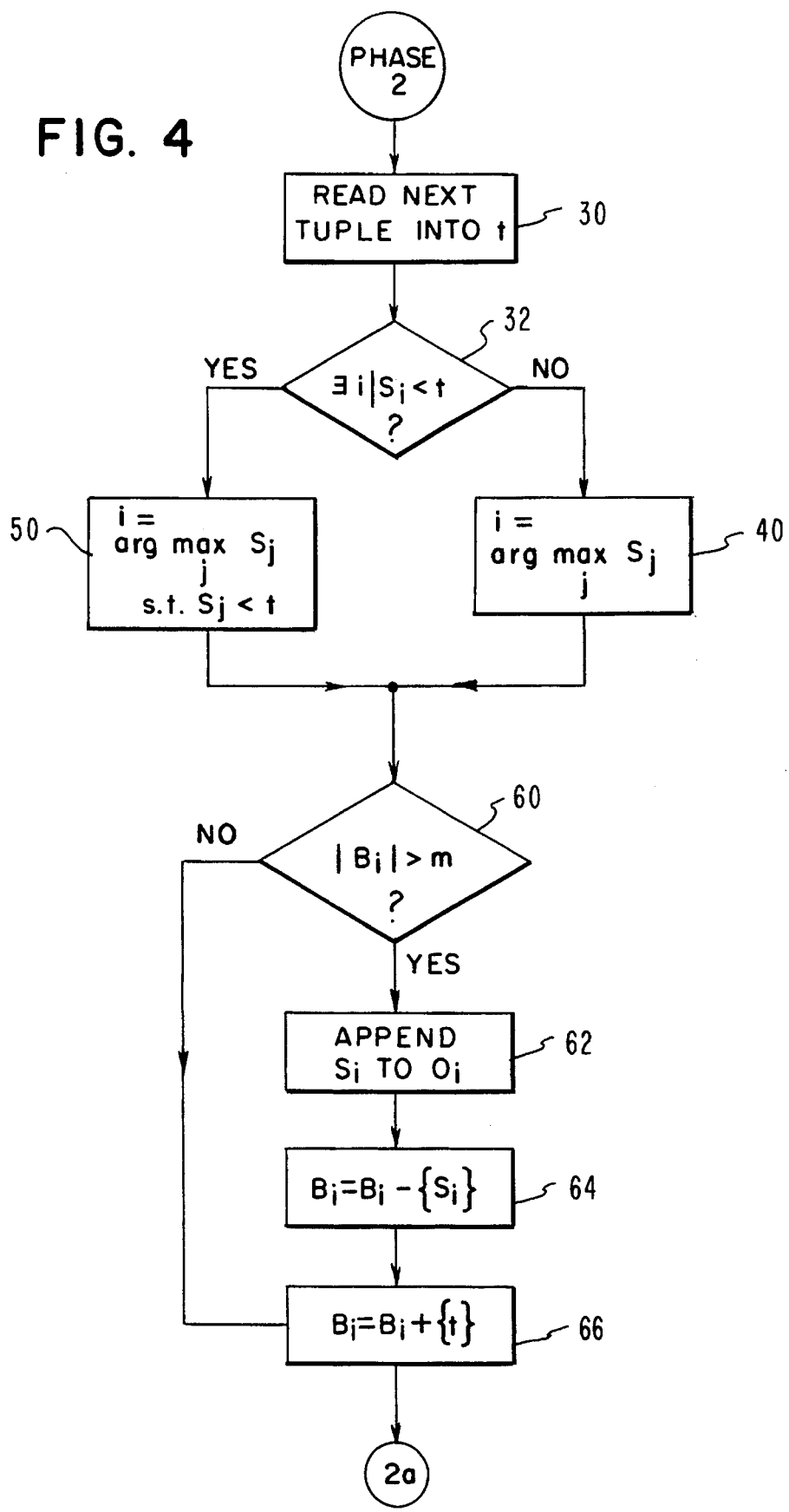
Figure 5:
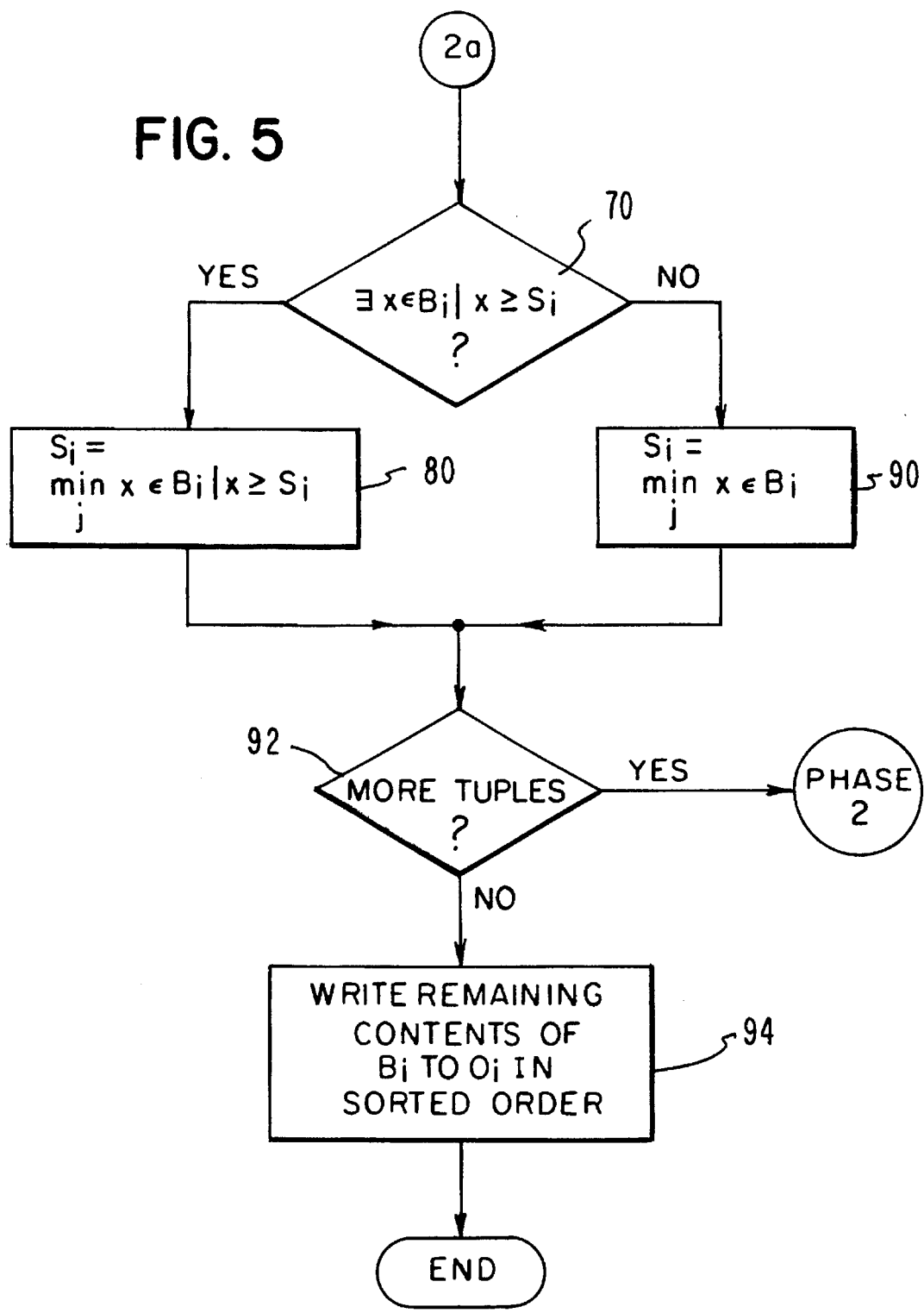

Referring now to FIG. 4 we begin the second phase of the method in which tuples are read in from disk and partitioned into sorted runs by each of the individual buffers. Blocks 30–92 define a loop which terminates when the last tuple has been read.

In block 30 the next tuple to be inserted into the sorted runs is read from disk. In block 32 the tuple is compared against the lower bounds of each of the buffers. If there is no lower bound smaller than the key value of the current tuple (other than the imaginary 0th block) then block 50 is executed and we select the buffer containing the largest elements. In essence, this buffer spans the end of a sorted run and the beginning of the next sorted run; we call this buffer the "anchor". All other buffers will be in the middle of creating a sorted run. If there is a lower bound smaller than the key then block 40 is executed and the buffer containing the largest lower bound smaller than the key of the current tuple is selected.

Entering block 60 a buffer i has been selected for the current tuple. A standard replacement selection method is applied between blocks 60 and 90. In block 60 the number of tuples in buffer i is checked. At the beginning of the algorithm the buffer will be only partially full. If the buffer is not completely full then we proceed to block 66. If the buffer has been completely filled the tuples stored in the buffer need to be written out to disk. In block 62 the smallest tuple in buffer i that is larger than the last value written to disk by this buffer in the current run is appended to the output. In block 64 this tuple is removed from the buffer.

In block 66 the new tuple is inserted into the buffer. Blocks 70 through 90 define the mechanism for reestablishing the boundaries for the buffer partitions. In block 70 we check to see if the current buffer is the anchor. If it is then the new lower bound for the buffer is selected, as shown in block 80, from the smallest tuple among those tuples in the buffer with a key value larger than the previous lower bound for the buffer. If it is not the anchor then the new lower bound for the buffer is selected, as shown in block 90, from the smallest key value among all the tuples in the buffer. The lower bound for all the other buffers remains unaffected.

Finally in block 92 we determine if there are any more tuples to be processed. If so, we repeat the loop by going back to block 30. Otherwise we complete the process by having each buffer write its remaining tuples to its output string as shown in block 94.

In order to clarify the above exposition we consider a simple example running in a parallel environment. In particular, we have three processors A, B and C. Each processor maintains a tournament tree of size 2. Assume we are sorting the integers between 1 and 12. Processor A contains, in order, the following tuples {7, 4, 9, 10, . . . }. Processor B contains, in order, the following tuples {3, 5, 2, 11, . . . }. Processor C contains, in order the following tuples {2, 8, 6, 1, . . . }. We initially partition the ranges so that Processor A subsumes the range 1 . . . 4, Processor B subsumes the range 5 . . . 8 and Processor C subsumes the range 9 . . . 12. Assume for this example, that Processors A, B and C read and send their tuples synchronously. Then, there will be four rounds in which each processor reads a tuple, transmits the tuple to the correct site, and inserts the tuple into the local tournament tree. The transmission is exemplified by the table of FIG. 6. We show the tournament tree, the range and the tuples written out to disk by each processor in each round.

While the invention has been described in terms of a preferred embodiment, those skilled in the art will recognize that the invention can be practiced with modifications within the spirit and scope of the appended claims.

We claim:

1. An external parallel sort method for use in a computer system having a plurality of record storage areas available for sorting, comprising the steps of:

partitioning a range of key values into a plurality of key subranges equal in number to the plurality of record storage areas;

assigning one of the key subranges to each of the record storage areas;

transferring unsorted records to be sorted to the record storage areas in accordance with a sort key value within each record and the key subrange assigned to each of the record storage areas;

when a record is transferred to a filled record storage area, transferring a record from said filled record storage area to an output string, the record transferred to the output string being the record that has the lowest key value that is not lower than the key value of the last record added to the output string of the filled record storage area;

when a record is transferred from a filled record storage area to the output string and has a higher key value than the last record added to said output string, updating the key subrange for the filled record storage area to begin at said higher key value; and when a key subrange is updated to begin at a key value higher than a key value next higher than an ending key value of the next lower subrange, increasing the ending key value of the next lower subrange to a new value which is not lower than a key value next lower than the higher key value, whereby said output strings contain sorted runs of records having an average run length determined by the size of the total record storage area rather than the size of the individual record storage areas.

2. The method of claim 1 wherein the transferring the group of records comprises the steps of comparing the sort key value to the subrange assigned to each of the record storage areas, identifying a record storage area which includes the subrange of the sort key; and, transferring the group of records to the record storage area which includes the subrange of the sort key.

3. The method of claim 1 wherein the subranges are partially overlapping.

4. The method of claim 1 wherein at least one of the subranges includes a group of at least one highest key value followed in ascending order by at least one lower key value.

5. The method of claim 1 wherein determination of which record to transfer out of a filled record storage area is made in accordance with a replacement-selection method.

6. The method of claim 5 wherein the transferring the group of records comprises the steps of comparing the sort key value to the subrange assigned to each of the record storage areas, identifying a record storage area which includes the subrange of the sort key; and, transferring the group of records to the record storage area which includes the subrange of the sort key.

7. The method of claim 6 wherein the subranges are partially overlapping.

8. The method of claim 7 wherein at least one of the subranges includes a group of at least one highest key value followed in ascending order by at least one lower key value.

9. An improved external parallel sorting method of the type wherein a group of records are sorted in parallel in a plurality of individual record storage areas that provide a total record storage capacity in aggregate which is still too small to hold all of the records of the group of records to be sorted, each said record having a key value for use in sorting, said key values all being within a range of possible key values, comprising the following steps implemented by a computer system:

partitioning said range of possible key values into a plurality of key subranges equal in number to said plurality of record storage areas, one of said key subranges possibly containing a group of one or more highest key values followed in ascending value order by a group of one or more lowest key values;

assigning one of said key subranges to each of said record storage areas;

transferring records of said group to said record storage areas in accordance with the key value of each record and the assigned key subrange for each said record storage area;

whenever a record is transferred to a filled record storage area, transferring a record from said filled record storage area to an output string created by each said filled record storage area, said record transferred to said output string of said filled record storage area being the record that has the lowest key value that is not lower than the last record added to said output string of said filled record storage area;

whenever a record is transferred from a filled record storage area to the output string for said filled record storage area and has a higher key value than the last record added to said output string of said filled record storage area, updating the key subrange for said filled record storage area to begin at said higher key value; and whenever a key subrange is updated to begin at a higher key value than the ending key value of the next lower subrange, increasing said ending key value of said next lower subrange to a value which is not lower than said higher key value, whereby said output strings contain sorted runs of records having an average run length determined by the size of the total record storage area rather then the size of the individual record storage areas.

10. An external parallel sort method for use in a computer system having a plurality of record storage areas available for sorting, comprising the steps of:

partitioning a range of key values into a plurality of key subranges equal in number to the plurality of record storage areas;

assigning one of the key subranges to each of the record storage areas;

transferring a group of records to be sorted to the record storage areas in accordance with a sort key value within each record and the key subrange assigned to each of the record storage areas;

when a record is transferred to a filled record storage area, transferring a record from said filled record storage area to an output string, the transferring comprising the steps of:

(a) determining whether there is among a record set comprising the record transferred to the filled record storage area and the record in the filled record storage area, one record that meets criteria that it has the lowest key value of the records in the record set, that is not lower than the key value of last record added to the output string of the filled record storage area;

(b) when step (a) determines that the criteria has been met, transferring the one record to the output string;

(c) when step (a) determines that the criteria has not been met, transferring the record having the lowest key in the record set to the output string;

when a record is transferred from a filled record storage area the output string and has a higher key value than the last record added to said output string, updating the key subrange for the filled record storage area to begin at said higher key value; and when a key subrange is updated to begin at a higher key value than an ending key value of the next lower subrange, increasing the ending key value of the next lower subrange to a new value which is not lower than the higher key value.

11. The method of claim 10 wherein determination of which record to transfer out of a filled record storage area is made in accordance with a replacement-selection method.

12. The method of claim 11 wherein the transferring the group of records comprises the steps of comparing the sort key value to the subrange assigned to each of the record storage areas, identifying a record storage area which includes the subrange of the sort key; and, transferring the group of records to the record storage area which includes the subrange of the sort key.

13. The method of claim 12 wherein the subranges are partially overlapping.

14. The method of claim 13 wherein at least one of the subranges includes a group of at least one highest key value followed in ascending order by at least one lower key value.

15. The method of claim 14 wherein the transferring the group of records comprises the steps of comparing the sort key value to the subrange assigned to each of the record storage areas, identifying a record storage area which includes the subrange of the sort key; and, transferring the group of records to the record storage area which includes the subrange of the sort key.

16. An external parallel sort system, comprising:

a computer having a plurality of record storage areas available for sorting, said computer further including;

means for partitioning a range of key values into a plurality of key subranges equal in number to the plurality of record storage areas;

means, coupled to the means for partitioning, for assigning one of the key subranges to each of the record storage areas;

means for transferring a group of records to be sorted to the record storage areas in accordance with a sort key value within each record and the key subrange assigned to each of the record storage areas;

means, coupled to each of the record storage areas, for transferring a record from a filled record storage area to an output string of the filled record storage area whenever a record is transferred to the filled record storage area, the record transferred to the output string being the record that has the lowest key value that is not lower than the key value of the last record added to the output string of the filled record storage area;

means, coupled to the means for assigning and the means for transferring, for updating the key subrange for the filled record storage area to begin at a first new key value when a record is transferred from a filled record storage area to the output string and has a higher key value than the last record added to said output string, and for increasing the ending key value of the next lower subrange to a second new key value which is not lower than the higher key value when a key subrange is updated to begin at a higher key value than an ending key value of the next lower subrange.

17. The system of claim 16 wherein determination of which record to transfer out of a filled record storage area is made in accordance with a replacement-selection method.

18. The system of claim 16 wherein the subranges are partially overlapping.

19. The system of claim 16 wherein at least one of the subranges includes a group of at least one highest key value followed in ascending order by at least one lower key value.

20. The system of claim 19 wherein the subranges are partially overlapping.

* * * * *